United States Patent Office 2,736,133
Patented Feb. 28, 1956

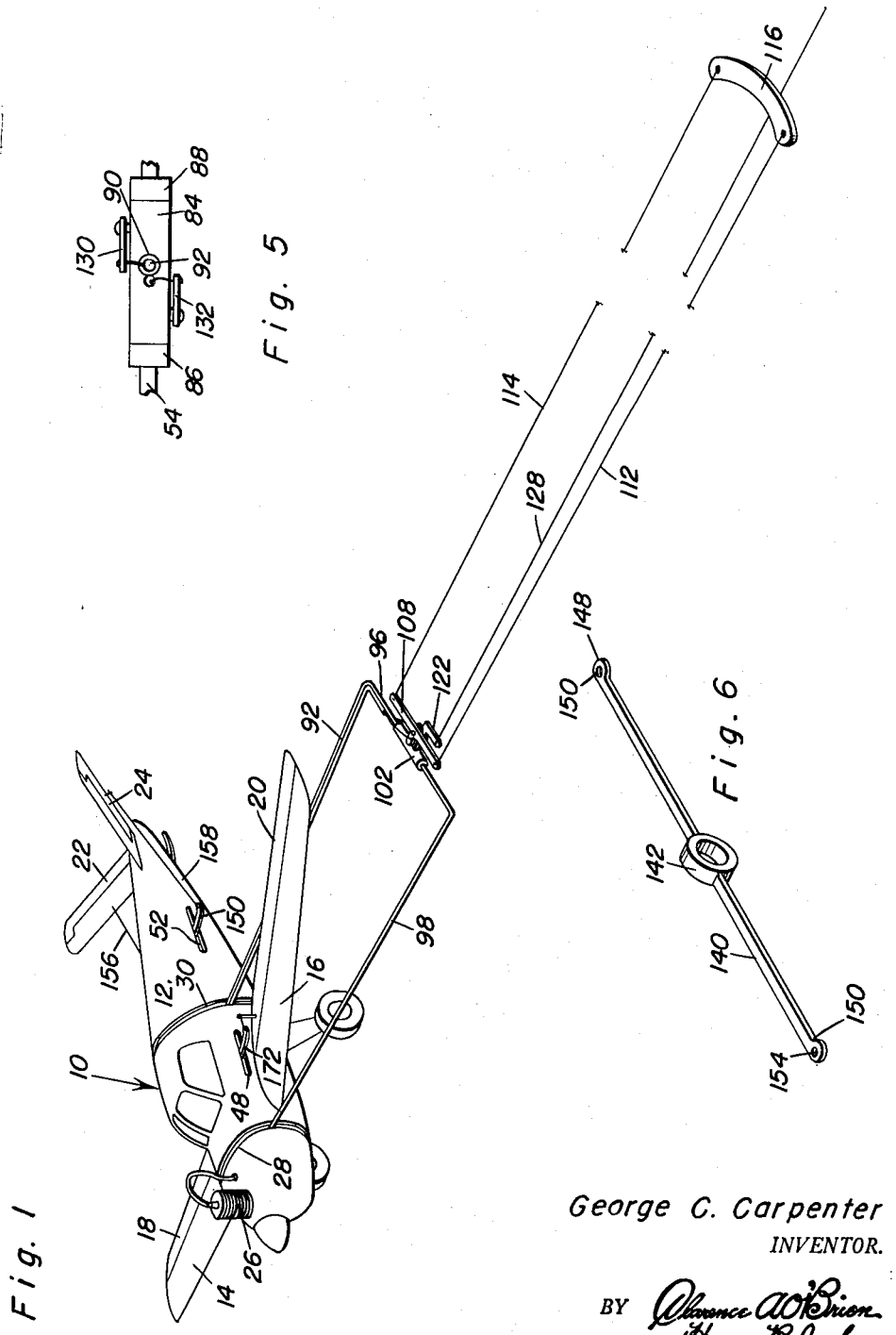

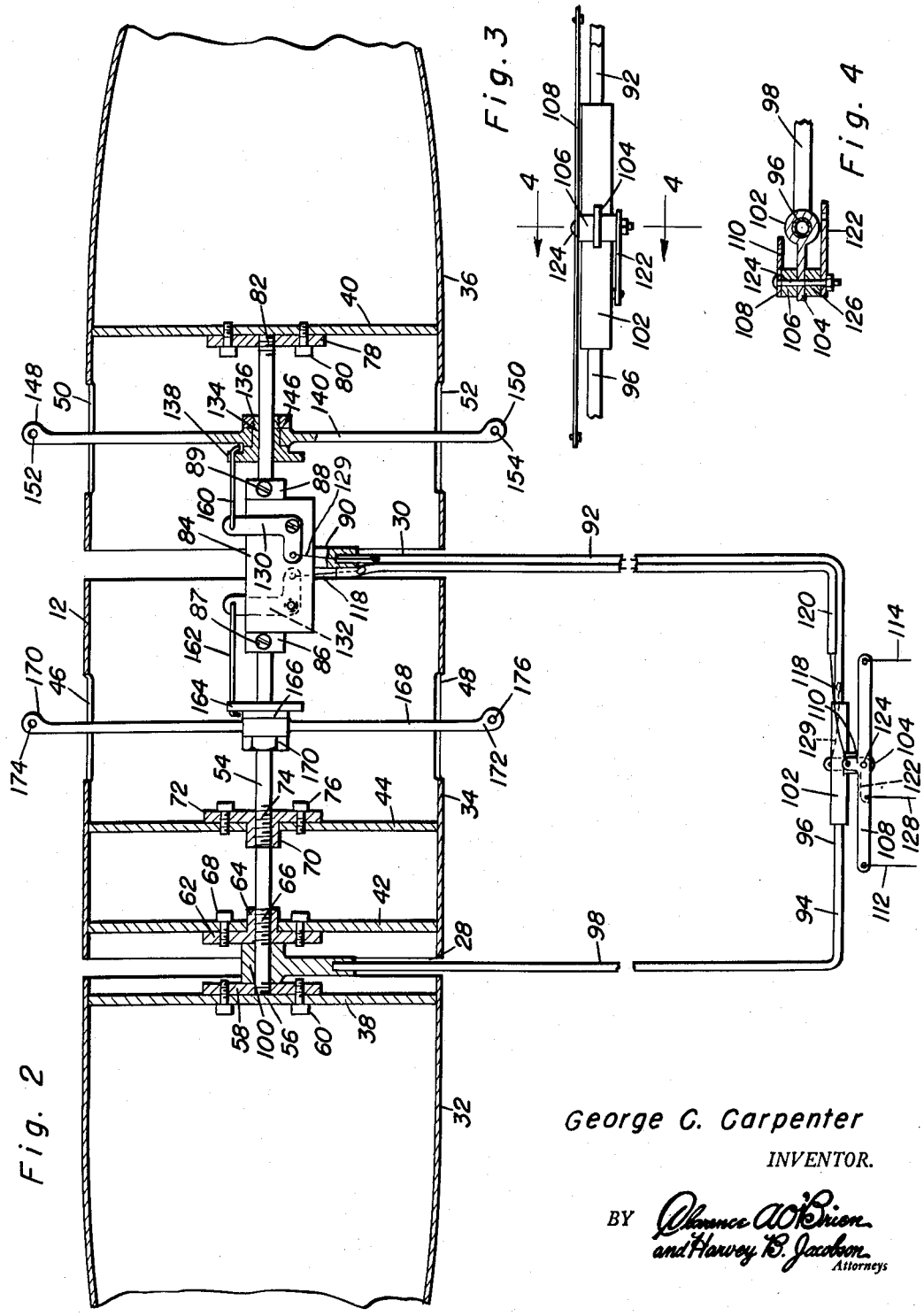

2,736,133
CONTROL DEVICE FOR MODEL AIRPLANES
George C. Carpenter, Grantsburg, Wis.
Application April 27, 1953, Serial No. 351,423
2 Claims. (Cl. 46—77)

This invention relates to a control device for a tethered model airplane and has for its primary object the provision of means for controlling the flight of a tethered model airplane in such manner that the airplane can be caused to execute various maneuvers whereby the entertainment and the amusement of the operator will be greatly enhanced.

The construction of this invention features a shaft joining sections of the fuselage of a model airplane together in such manner as to permit a 360° rotation of the control yoke of this device relative to the airplane. Mounted on the shaft are control arms which are adapted to actuate the elevators and the ailerons of the model airplane in such manner as to cause the airplane to climb or dive, and to loop, or execute various other maneuvers.

Still further objects of the invention reside in the provision of a control device for model airplanes which is capable of being readily and easily installed on various existing model airplanes, which is comparatively light in weight and easy to operate, which employs a minimum number of parts compatible with the effective operation of the device and which is relatively inexpensive to construct.

These, together with the various ancillary objects and features of the invention which will become apparent as the following description proceeds, are attained by this control device, a preferred embodiment of which has been illustrated in the accompanying drawings, by way of example only, wherein:

Figure 1 is a perspective view illustrating the manner in which the control device is attached to a model airplane for effective operation thereof;

Figure 2 is an enlarged sectional detail view illustrating the construction of a fuselage of a model airplane employing this control device and illustrating the manner in which the elevators and ailerons are controlled;

Figure 3 is an enlarged side elevational view of the means attached to the yoke for actuating the control wires;

Figure 4 is a vertical sectional view as taken along the plane of line 4—4 of Figure 3;

Figure 5 is a side elevational view illustrating the construction of the control block and crank arms pivotally mounted thereon; and, Figure 6 is a perspective view illustrating the construction of one of the control arms.

With continuing reference to the accompanying drawings wherein like reference numerals designate similar parts throughout the various views, reference numeral 10 generally designates a model airplane having a fuselage 12, wings 14 and 16 having ailerons 18 and 20 attached thereto. The fuselage 12 further has elevators 22 and 24 affixed thereto. The model airplane 10 may be powered by a suitable miniature gasoline engine 26 or by any other suitable means. Most model airplanes having miniature gasoline motors are flown at the end of a tethering line or the like so as to prevent the loss or damage of the model airplane due to an extended free flight which may place the model aircraft at a location where it is impossible to make a safe landing. However, though the tethering line will usually restrain the model airplane to a circular flight about the end of the tethering line as an origin, the model aircraft cannot be readily maneuvered. The control device comprising the present invention is adapted to actuate the ailerons 18 and 20 and elevators 22 and 24 so as to permit various maneuvers to be accomplished by the model airplane 10 at the will of the operator.

The fuselage 12 is provided with a pair of circumferential slots 28 and 30 which divide the fuselage 12 into three sections 32, 34 and 36. The rear portion of the forward section 32 terminates in a bulkhead 38 while the rear section 36 has a bulkhead 40 adjacent to the front end thereof but spaced therefrom. A pair of bulkheads 42 and 44 are formed in the section 34, the bulkhead 42 being immediately adjacent the front end of the section 34 while the bulkhead 44 is spaced from the rear end thereof. The section 34 has a pair of elongated apertures 46 and 48 therein and the rear section 36 is likewise provided with elongated apertures 50 and 52. The control device employs a shaft 54 which is permanently and rigidly mounted in the fuselage 12 and effectively forms a backbone for the separated sections of the fuselage 32, 34 and 36. The shaft 54 is threaded at its forward end as at 56 for threaded engagement with a plate 58 which is detachably secured to the bulkhead 38 by means of suitable fasteners or screws 60. A plate 62 having a threaded extension 64 is threadedly engaged on the threaded portion 66 of the shaft. The plate 62 is detachably secured by means of fastener 68 to the bulkhead 42, the extension 64 extending through a suitable central aperture in the bulkhead 42. The bulkhead 44 has a central aperture therethrough through which an extension 70 of a plate 72 extends. The shaft 54 has a threaded portion 74 threadedly engaged with the plate 72 and its extension 70. The plate 72 is detachably secured to the bulkhead 44 by means of screw fasteners 76. The bulkhead 40 has a plate 78 detachably secured thereto by means of screw fasteners 80, the plate 78 being internally centrally threaded for reception of the threaded rear end 82 of the shaft 54.

A control block 84 is freely rotatably mounted on the shaft 54 and is prevented from sliding movement by collars 86 and 88 which are adjustably affixed in a selected position by means of set screws 87 and 89. The control block 84 has a projecting cylindrical member 90 to which one end of a tubular conduit 92 is firmly attached. The tubular conduit 92 forms one leg of a substantially U-shaped yoke 94 having a central connecting portion 96 interconnecting the leg portion 92 with the other leg portion 98. The leg 98 is attached to a rotating block 100 freely rotatable on the shaft 54 but limited to rotary movement and prevented from sliding movement by the position of the plates 58 and 62 respectively. It is to be noted that the legs 92 and 98 extend into the slots 28 and 30.

Mounted on the central portion 96 of the yoke 94 is a tubular member 102 which has an outwardly extending plate 104 attached thereto. Pivotally mounted on the plate 104 and supported by a bearing block 106 is a control bar 108 having an inwardly extending projection 110. Attached to the control bar 108 are control leads 112 and 114 which are attached at their other ends to the hand control member 116. Attached to the projection 110 of the control bar 108 is a control wire 118 which extends through a tubular conduit 120 running parallel with and attached to the tubular conduit 92. There is provided an L-shaped control bar 122 which is pivotally attached by means of the bolt 124 to the plate 104 at the juncture between the arms thereof which extend normal to each other. The bolt 124 extends through the control bar 108, the bearing block 106, the plate 104, and the bearing block 126 together with the control bar 122. A control lead 128 is attached to one arm of the L-shaped control bar 122 and is adapted to be engaged by the hand of the operator, the other arm of the control bar 122 having a control wire 129 attached thereto. The control wire 129 extends through the tubular conduit 92. Pivotally mounted on the control block 86 is an L-shaped crank arm 130. On the other side of the control block 84 from the crank arm 130 there is pivotally mounted another L-shaped crank arm 132. The control wires 118 and 129 are respectively attached to the crank arms 132 and 130.

Slidably mounted on the shaft 54 is a bearing mount 134 which is threaded at one end as at 136 and which has a disc-like flange 138 at the other end thereof. A control arm 140 having a central tubular portion 142 rotatable on the bearing mount 134 is positioned on the bearing mount 134. A collar 146 is provided and is threadedly engaged on the threaded end portion 136 of the bearing mount 134 for retaining the operating arm 140 on the bearing mount 134. The operating arm 140 has end portions 148 and 150 provided with apertures 152 and 154 therethrough through which control wires 156 and 158 extend. The control wires 156 and 158 are attached at their other ends to the movable segments of the elevators 22 and 24. The outer portions 148 and 150 of the operating arm 140 extend through the slots 50 and 52 in the fuselage section 36. The crank arm 130 is interconnected with the bearing mount 134 by means of a link 160 which extends through suitable apertures in the crank arm 130 and in the disc-like flange 138. Another link 162 extends through suitable apertures in the crank arm 132 and in the disc-like flange 164 of the bearing mount 166. A second operating arm 168 is held in position on the bearing mount 166 by means of a threaded collar 170 of similar construction to the threaded collar 146. The operating arm 168 is of similar construction to the operating arm 140 and the outer portions 170 and 172 provided with eyelets 174 and 176 extend through the apertures 46 and 48 in the fuselage section 34. The operating arm 168 is connected by means of suitable control wires to the ailerons 18 and 20 on the wings 14 and 16 of the airplane 10.

In operation, upon actuation of the control bar 108 by means of movement of the control leads 112 and 114 by the operator, the control wire 118 will be moved thus causing movement of the crank arm 132 pulling or pushing the crank arm 132, the exposed end of the control wire 118 being sufficiently rigid to push the crank arm 132. This will pull or push the bearing mount 166 which is slidable on the shaft 54 toward the rear of the plane or else push it forwardly. The control arm 168 which is rotatably mounted on the bearing mount 166 will, of course, slide with the bearing mount 166 and so raise or lower the ailerons 18 and 20. Likewise, upon actuation of the control lead 128, the control wire 129 will push or pull the crank arm 130 causing movement of the operating arm 140 and hence the raising or lowering of the elevators 22 and 24, the exposed ends of the control wire 129 being sufficiently rigid to push the crank arm 130. It is to be noted that the shaft 54 is firmly fixed relative to the fuselage 12 but that the yoke including the control block 84 and the rotating member 100 may be freely rotated about the shaft 54. Likewise, the bearing mounts 166 and 134 may rotate about the shaft 54 in conjunction with the control block 84 throughout a 360° arc even though the control arms 168 and 140 are limited in movement relative to the fuselage 12. Thus, the airplane 10 can be caused to execute various interesting and entertaining maneuvers so as to greatly increase the enjoyment and amusement of the operator.

Since from the foregoing, the construction and advantages of this control device for model airplanes are readily apparent, further description is believed to be unnecessary.

However, since numerous modifications will readily occur to those skilled in the art after a consideration of the foregoing specification and accompanying drawings, it is not intended to limit the invention to the precise embodiment shown and described but all suitable modifications and equivalents may be readily resorted to.

What is claimed as new is as follows:

1. A control device for model airplanes comprising a shaft secured in the fuselage of an airplane, a control block rotatably mounted on said shaft, operating arms slidably mounted on said shaft and connected to the ailerons and elevators of said airplane and means for slidably moving said arms secured to said block, said means comprising crank arms pivotally secured to said control block, means connecting said crank arms with said operating arms, and actuating means attached to said crank arms for controlling the position of said crank arms, said actuating means comprising links each attached to said crank arms at one end thereof, said operating arms being rotatably mounted on bearing mounts, said bearing mounts being slidably positioned on said shaft, said operating arms rotating independently of their associated bearing mounts and slidable with their associated bearing mounts, the other ends of said links being attached to said bearing mounts, said control block having tubular conduits attached thereto and flexible control wires extending through said tubular conduits, said control wires being attached to said crank arms, a U-shaped control yoke, said tubular conduits forming a portion of said U-shape control yoke, said yoke being rotatably mounted on said shaft, the fuselage of said airplane having circumferential slots permitting 360° rotation of said yoke relative to said fuselage, said tubular conduits being of a greater length than one-half the wing span of the airplane to permit said airplane to maneuver.

2. A control device for model airplanes comprising a shaft secured in the fuselage of an airplane, a control block rotatably mounted on said shaft, operating arms slidably mounted on said shaft and connected to the ailerons and elevators of said airplane and means for slidably moving said arms secured to said block, said means comprising crank arms pivotally secured to said control block, means connecting said crank arms with said operating arms, and actuating means attached to said crank arms for controlling the position of said crank arms, said actuating means comprising links each attached to said crank arms at one end thereof, said operating arms being rotatably mounted on bearing mounts, said bearing mounts being slidably positioned on said shaft, said operating arms rotating independently of their associated bearing mounts and slidable with their associated bearing mounts, the other ends of said links being attached to said bearing mounts, said control block having tubular conduits attached thereto and flexible control wires extending through said tubular conduits, said control wires being attached to said crank arms, a U-shaped control yoke, said tubular conduits forming a portion of said U-shaped control yoke, said yoke being rotatably mounted on said shaft, the fuselage of said airplane having circumferential slots permitting 360° rotation of said yoke relative to said fuselage, said tubular conduits being of a greater length than one-half of the wing span of the airplane to permit said airplane to maneuver, said fuselage having bulkheads on each side of said slots, said shaft extending between said bulkheads to said shaft, and control bars pivotally mounted on said yoke, said control wires being attached to said control bars, and remote control leads attached to said control bars for actuating said control bars to cause said control wires to operate said crank arms to slide said bearing mounts to cause said operating arms to selectively actuate said elevators and ailerons.

References Cited in the file of this patent
UNITED STATES PATENTS

| | | |
|---|---|---|
| 2,061,953 | Sampson | Nov. 24, 1936 |
| 2,595,650 | Eppler | May 6, 1952 |
| 2,624,152 | Sneed | Jan. 6, 1953 |
| 2,659,999 | Turner | Nov. 24, 1953 |